United States Patent

Hattori et al.

[11] Patent Number: 5,172,877
[45] Date of Patent: Dec. 22, 1992

[54] PIPE FIXING STRUCTURE USING CLAMP MEMBER

[75] Inventors: Koutaro Hattori; Kuniaki Sugiyama; Takeshi Matsumoto, all of Numazu, Japan

[73] Assignee: Usui Kokusai Sangyo Kaisha Ltd., Japan

[21] Appl. No.: 751,141

[22] Filed: Aug. 28, 1991

[30] Foreign Application Priority Data

Aug. 31, 1990 [JP] Japan .................. 2-91855[U]
Sep. 28, 1990 [JP] Japan .................. 2-101669[U]

[51] Int. Cl.⁵ ........................................ F16L 3/00
[52] U.S. Cl. ........................... 248/68.1; 24/535; 24/569; 248/74.1
[58] Field of Search ............ 248/300, 67.5, 74.4, 248/74.5, 59, 58, 68.1, 62, 74.1; 24/535, 569, 339

[56] References Cited

U.S. PATENT DOCUMENTS

| | | | |
|---|---|---|---|
| 978,398 | 12/1910 | Rischard | 24/339 |
| 3,906,592 | 9/1975 | Sakasegawa et al. | 248/68.1 |
| 4,183,485 | 1/1980 | Gladieux | 248/68.1 |
| 4,609,171 | 9/1986 | Matsui | 248/68.1 X |
| 4,799,641 | 1/1989 | Koreski | 248/68.1 |
| 4,865,279 | 9/1989 | Kosugi | 248/68.1 |
| 4,960,253 | 10/1990 | Perrault et al. | 248/68.1 |

FOREIGN PATENT DOCUMENTS

| | | | |
|---|---|---|---|
| 1099326 | 9/1955 | France | 248/74.4 |
| 1562068 | 4/1969 | France | 248/68.1 |
| 1226569 | 3/1971 | United Kingdom | 248/68.1 |

Primary Examiner—David L. Talbott
Attorney, Agent, or Firm—Anthony J. Casella; Gerald E. Hespos

[57] ABSTRACT

Herein disclosed is a pipe fixing structure using a clamp member, which comprises: clamp means including a band-shaped plate member having wall portions opposed to each other and a plurality of projections on its inner periphery; a plurality of pipes each having a cylindrical member of heat-shrinkable resin fixed on its outer circumference in registration with the projections and adapted to be clamped by the clamp means; and fastening means for fastening the band-shaped plate member in a direction to bring the opposed wall portions toward each other so as to cause the projection to bite into the cylindrical members.

13 Claims, 5 Drawing Sheets

PIPE FIXING STRUCTURE USING CLAMP MEMBER

BACKGROUND OF THE INVENTION

1. Field of the Invention

The present invention relates generally to an improvement in a pipe bracing or clamping fixing structure using a clamp member, for a pipe having a relatively small diameter such as 20 mm or less and arranged as an oil or air feed passage in an automobile or a variety of machines or apparatus.

2. Description of the Prior Art

A fixing structure known in the prior art, as belonging to this kind, is exemplified in FIG. 12 and FIG. 13.

A first example of the bracing fixing structure will be described with reference to FIG. 12. The wall portions of pipes P' to be clamped are braced with a bracing wall 12, which is formed at one end of a clamp member 11 made of a band-shaped plate member. Reference numeral 13 designates a mounting hole for mounting the pipes P' on a base by means of a bolt.

Next, another example of the clamping fixing structure of the prior art will be described with reference to FIG. 13. The walls of the pipes P' to be fixed have their outer circumferential portions clamped or fixed to each other by means of a fastening bolt 13' such that they are covered with the individual curved clamping wall portions 12 of clamp member 11 which is composed of a pair of upper and lower mating moldings. Although not shown, still another example of the fixing structure of the prior art using the clamp member is constructed such that the outer circumferential portions of the pipes and the curved clamping wall portions of the clamp member are heated and soldered to each other.

In the former fixing structure, as shown in FIG. 12, of those technologies of the prior art, however, the pipes P' are merely braced on the steel surfaces. As a result, the braced degree is dispersed to make the fixing relation generally unreliable. Thus, the fixed portions may offset or turn due to the vibrations, if any, to scratch or scrape the corrosion resisting film on the outer circumferences of the pipes P' thereby to deteriorate the anti-corrosion locally. As the case may be, still the worse, the pipes P' may be cracked or broken.

In the latter fixing structure, as shown in FIG. 13, the pipes P' are also merely braced on the steel surfaces. As a result, the braced degree is likewise dispersed to make the fixing relation generally unreliable. Thus, the fixed portions may also offset or turn due to the vibrations, if any, to scratch or scrape the corrosion resisting film on the outer circumferences of the pipes P' thereby to deteriorate the anti-corrosion locally. As the case may be, still the worse, the pipes P' may also be cracked or broken.

In the not-shown fixing structure by the heating and soldering treatment, on the other hand, the coating films applied in advance for corrosion resistance to the pipes P' and the clamp member 11 are broken by the heating and soldering treatment so that an additional treatment is required. This requirement is seriously troublesome for a product having a large length and a complicated bent shape. Another problem is that the pipes P' are thermally deteriorated by the heating and soldering treatment required.

SUMMARY OF THE INVENTION

The present invention has been conceived in view of the above-specified problems concomitant with the prior art and has an object to provide a pipe fixing structure using a clamp member, which is enabled to use no additional corrosion resisting treatment by using pipes and a clamp member both coated in advance with corrosion resisting films, which is freed from any fear of the scratch or scrape of the corrosion resisting films and the crack or breakage of the pipes by preventing the offset and turn of the fixing portions reliably for a long time even with the vibrations, and which can prevent the thermal deterioration of the additional heating and soldering treatment, if any, and can be applied to pipes made of a material reluctant to be soldered.

In order to achieve the above-specified object, according to a first mode of the present invention, there is provided a pipe fixing structure using a clamp member, which comprises: clamp means including a band-shaped plate member having wall portions opposed to each other and a plurality of projections on its inner periphery; a plurality of pipes each having a cylindrical member of heat-shrinkable resin fixed on its outer circumference in registration with said projections and adapted to be clamped by said clamp means; and fastening means for fastening said band-shaped plate member in a direction to bring said opposed wall portions toward each other so as to cause said projection to bite into said cylindrical members.

According to a second mode of the present invention, there is provided a pipe fixing structure using a clamp member, wherein a cylindrical member made of a heat-shrinkable resin is fixed on the outer circumference of the wall portion of a pipe, and wherein a clamp member formed of a band-shaped plate member having a plurality of projections on the inner periphery of at least one of the wall portions, which are folded in the vicinity of the longitudinally central portion to form a clamping wall and opposed to each other, is fastened by fastening means at its opposed flattened wall portions to cause said projections to bite into the outer circumference of said cylindrical member so that said clamping wall may cover and engage.

According to a third mode of the present invention, there is provided a pipe fixing structure using a clamp member, wherein a cylindrical member made of a heat-shrinkable resin is fixed on the outer circumference of the wall portion of a pipe, and wherein a clamp member formed of a pair of upper and lower plate members having a plurality of projections on at least one of the inner peripheries of curved or bent clamping walls positioned at two end portions and opposed to each other is fastened by fastening means generally at the widthwise central portions thereof to cause said projections to bite into the outer circumference of said cylindrical member so that said curved or bent walls may cover and engage elastically.

Thanks to this structure, according to the present invention, the cylindrical resin member is fixed in advance on the pipes, and these pipes are covered and engaged from their outer sides by the bracing or clamping wall portions of the clamp member which has one or paired band-shaped plate members having the projections on their inner peripheries. Since the cylindrical members themselves are thermally shrunken onto the pipes and since the projections bite into the cylindrical members as the fastening proceeds, the mutual offset and turn of the fixed portions can be reliably prevented for a long time even with the vibrations. As a result, the pipes and the clamp members can be freed, if they are coated in advance with the corrosion resisting films, from having their coating films scratched or peeled and from having the pipes cracked and broken, so that the troublesome working for the additional corrosion resisting treatment can be eliminated. Moreover, it is possible to prevent the thermal deterioration of the pipes due to the heating and soldering treatment, if any, and to apply the fixing structure to the pipes which are reluctant to be soldered.

DETAILED DESCRIPTION OF THE PREFERRED EMBODIMENTS

Figure 1:
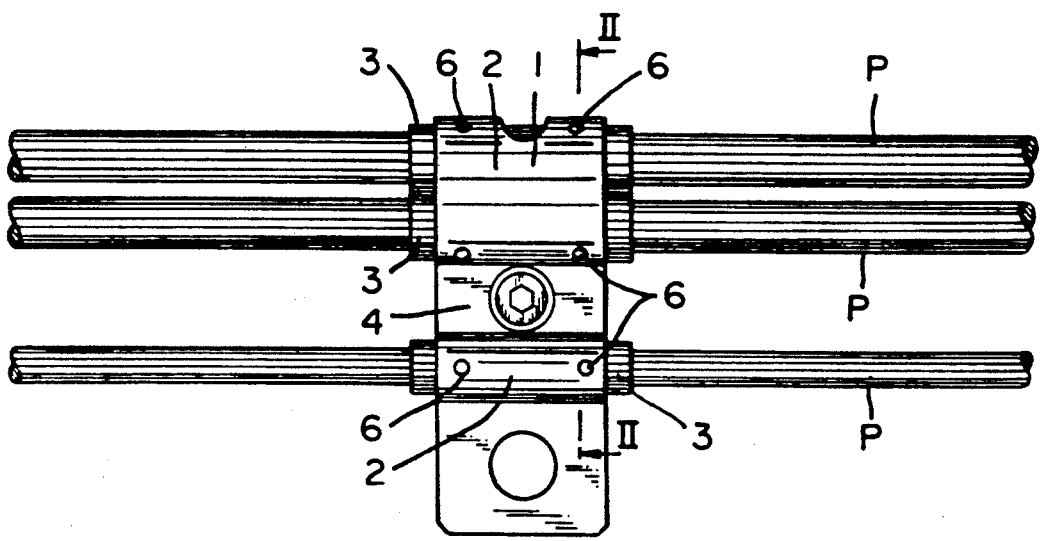
FIG. 1 is a top plan view showing a pipe bracing fixing structure using a clamp member in accordance with one embodiment of the present invention.

Throughout the Figures, identical portions will be designated at common reference numerals.

Figure 2:
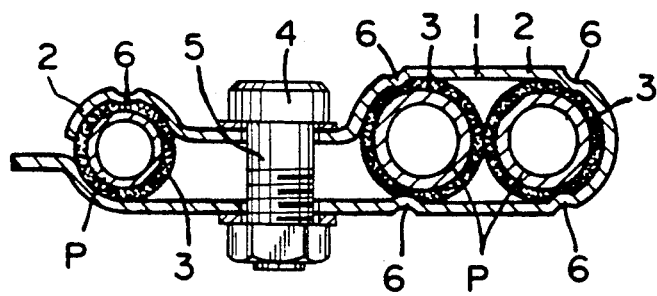
FIG. 2 is an enlarged section showing a portion and taken along line II—II of FIG. 1.
Figure 3:
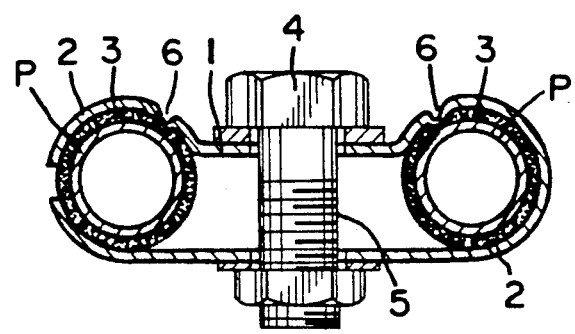
FIGS. 3 to 5 individually correspond to FIG. 2 but show other embodiments.
Figure 4:
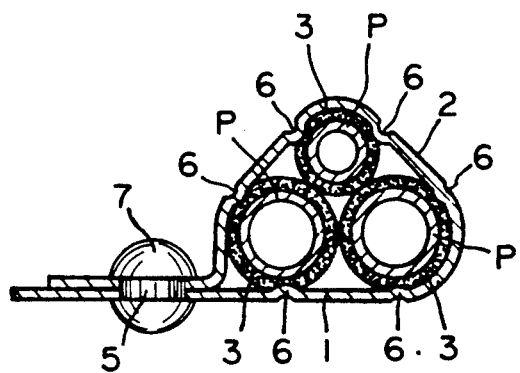
Figure 5:
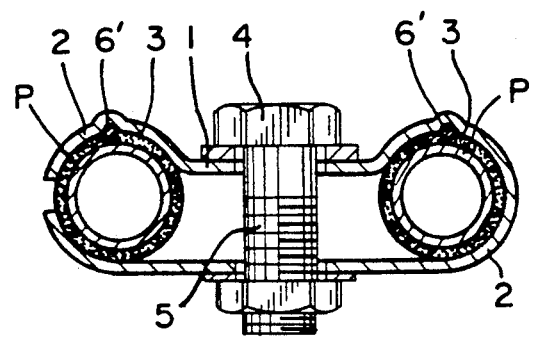

First of all, in the embodiments shown in FIGS. 1 to 5, reference numeral 1 designates a clamp member which is formed of a band-shaped plate member. This clamp member 1 is prepared by pressing the plate member to fold it back generally at the longitudinal central portion thereby to form a clamping wall 2 having a parallel, curved or rectangular section and by forming a plurality of projections 6 on the inner periphery of one or two wall portions opposed to each other. The projections 6 are either projected generally in parallel with the fastening direction of the clamp member 1 and offset from the center axis of pipes P to be braced (as shown in FIG. 3) or projected toward the center axis of the pipe (as shown in FIGS. 2 and 4). Alternatively, the projections may be prepared either by punching the clamping wall 2 simultaneously with the formation of the clamp member 1 or after the assembly of the pipes P or by fixing other projections to the inner periphery of the clamp member 1. As shown in FIG. 5, moreover, the projections may be prepared by arranging separate biting small members 6' in recesses which are formed in the inner periphery of the clamp member 1. A fastening bolt 4 or rivet 7 is fitted in a through hole 5 which is formed in the vicinity of either the intermediate portion (as shown in FIGS. 2 and 3) or one end portion (as shown in FIG. 4) of the flattened walls opposed to each other. Reference numeral 3 designates a cylindrical member which has an adhesiveness on its inner circumference and which is made of a heat-shrinkable resin. The cylindrical member 3 is fitted on the wall portion of the pipe P to be clamped and is fixed thereto by heating it at a low temperature. The clamping wall 2 of the clamp member 1 is fixed on and engaged with the outer circumference of the cylindrical member 3 when it is fastened by the fastening bolt or rivet 4, to cause the aforementioned projections 6 to bite into the outer circumference of the cylindrical member 3. Incidentally, a plurality of pipes P are fixedly braced altogether such that they are arrayed in a flat shape, as shown in FIGS. 2 and 3, or in a stacked form, as shown in FIG. 4. Moreover, the clamp member 1 has its thickness suitably selected in dependence upon the number, diameter and so on of the pipes P to be braced.

Next, other embodiments will be described in the following with reference to FIGS. 6 to 11.

Reference numeral 1 designates a clamp member which is composed of a pair of upper and lower mating moldings. Like the aforementioned embodiments, plate members 1a and 1b are pressed to form generally semicircular curved clamping walls 2' at their individual two longitudinal end portions. Moreover, at least one of the clamping walls opposed to each other has its inner periphery formed with a plurality of projections which are eccentric to the center axis of the pipe P to be clamped and generally in parallel with the fastening direction of the clamp member 1.

With the clamping walls 2' being opposed to each other, the fastening bolt 4 is fitted in the through hole which is formed generally in the widthwise central portion of the plate members 1a and 1b. Reference numeral 3 designates a cylindrical member which has an adhesiveness on its inner circumference and which is made of a heat-shrinkable resin. The cylindrical member 3 is fitted on the wall portion of the pipe P to be clamped and is fixed thereto by heating it at a low temperature. The widthwise central portions of the clamp member 1 are elastically fixed on and engaged with the outer circumference of the cylindrical member 3 with their widthwise central portions being opposed to each other, when they are fastened by the fastening bolt 4 or the like, to cause the aforementioned projections 6 to bite into the outer circumference of the cylindrical member 3.

Figure 6:
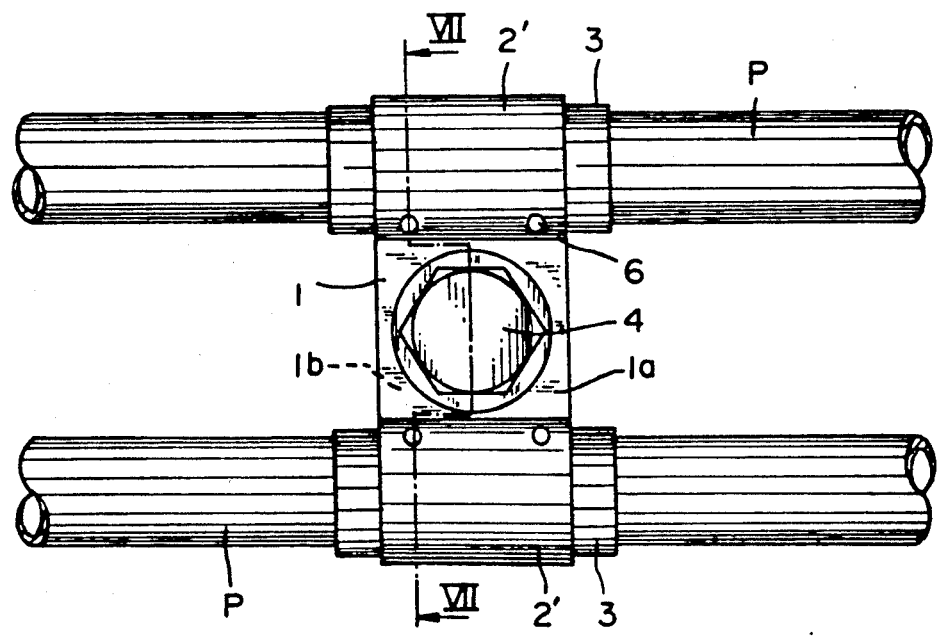
FIG. 6 is a top plan view showing a pipe clamping fixing structure using a clamp member, in accordance with a further embodiment of the present invention.
Figure 7:
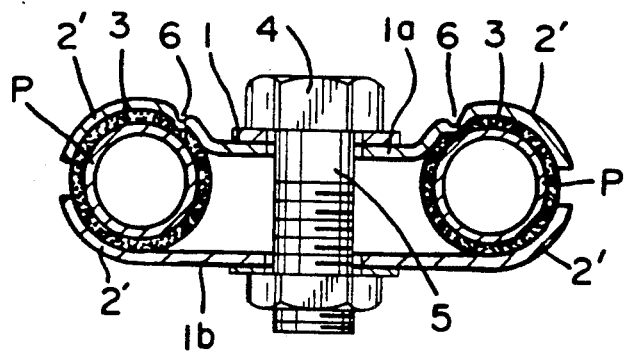
FIG. 7 is a section showing a portion and taken along line VII—VII of FIG. 6.
Figure 8:
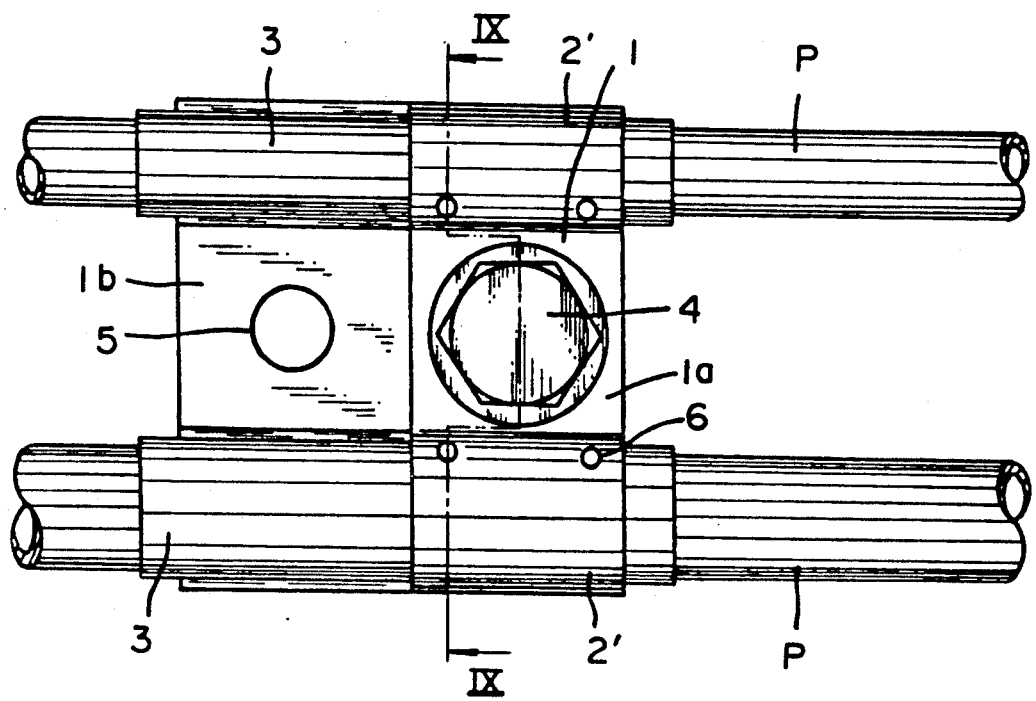
FIG. 8 corresponds to FIG. 6 but shows a further embodiment.
Figure 9:
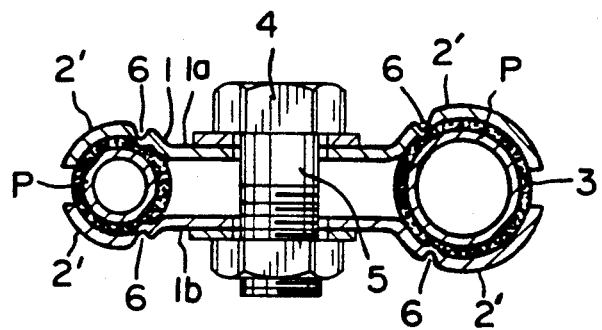
FIG. 9 is a section showing a portion and taken along line XI—XI of FIG. 8.

The plate members 1a and 1b need not be given the identical shape, as shown in FIGS. 6 and 7, but may be different in the longitudinal direction of the pipe P, as shown in FIGS. 8 and 9. The clamp member 1 can clamp and fix even the pipes P having different diameters, and the projections 6 may be either formed on the two sides of the curved clamping walls 2' or use the biting small members.

Figure 10:
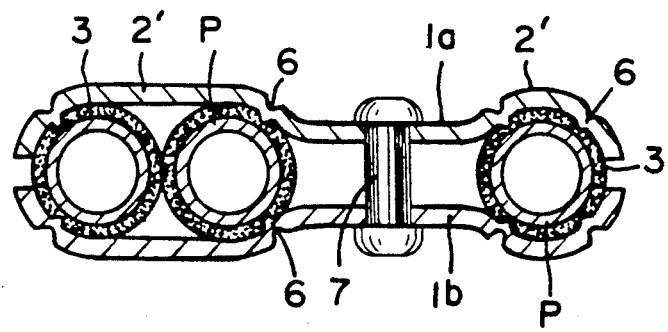
FIGS. 10 and 11 individually correspond to FIG. 7 but show other embodiments.

As shown in FIG. 10, moreover, the pipes P can be clamped altogether even if they are juxtaposed in multiple rows on at least one of the clamping walls 2'. In this case, the projections 6 are preferably directed toward the center axis of the corresponding one of the pipes P so as to ensure the clamped state of the pipe P. For reinforcing purposes, moreover, the plate members 1a and 1b are preferably made thicker than those of the embodiments of FIGS. 6 to 9.

Figure 11:
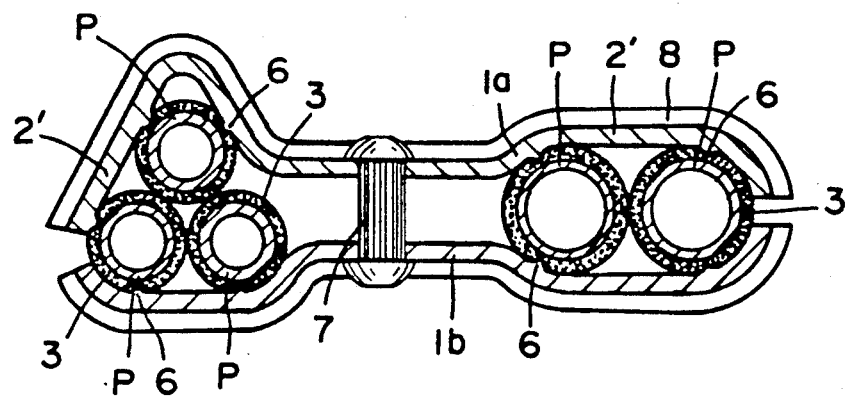
Figure 12:
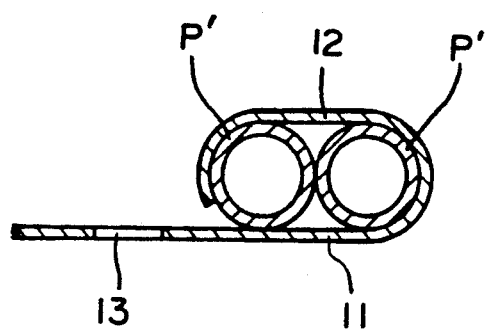
FIGS. 12 and 13 are transverse sections individually showing the examples of the bracing or clamping fixing structures of the prior art.
Figure 13:
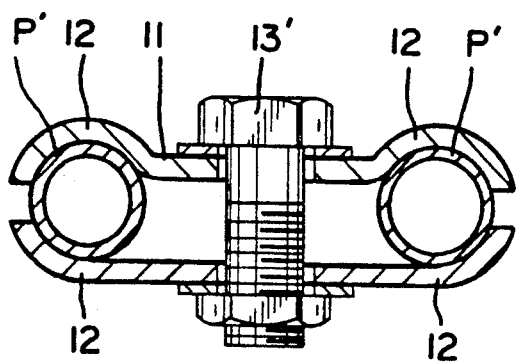

The fastening of the generally central portion of the clamp member 1 is accomplished by means of the rivet 7 in place of the bolt 4. On the other hand, the case, in which the pipes P are clamped altogether in multiple stages, is shown in FIG. 11. In this case, the clamping walls 2' are bent, and the ends of the plate members 1a and 1b, as taken in the axial direction of the pipes P, are raised to form ribs 8 so that the plate members 1a and 1b may be reinforced.

In the pipe bracing fixing structure using the clamp member according to the present invention, as has been described hereinbefore, the pipes P are fastened by the clamping wall 2 or walls 2' of the clamp member 1, which is made of one or a pair of band-shape plate members having the projections 6, such that the cylindrical members 3 made of a heat-shrinkable resin are fixedly sandwiched between the wall portions of the pipes P to be fastened and the clamp member 1 and such that the projections 6 bite into the cylindrical members 3. As a result, the pipes P and the clamp member 1, which are given in advance the corrosion resisting films, can be used to eliminate any additional troublesome corrosion resisting treatment. Even with the vibrations in the arranged state, the fixed portions can be reliably freed from the mutual offset or turn for a long time thereby to eliminate the fear of scratching and scraping the corrosion resisting films and cracking and breaking the pipes P. Still moreover, the pipes can be prevented, even if prepared by the heating and soldering treatment, from being thermally deteriorated. At the same time, this structure can also be applied to the pipes which are reluctant to be soldered. Thus, it is possible to provide a remarkably useful pipe fixing structure using the clamp member.

We claim:

1. A pipe fixing structure for clamping a plurality of pipes in fixed parallel relationship to one another, each said pipe having a center axis and an outer circumference, said pipe fixing structure comprising:
    a plurality of cylindrical members of heat-shrinkable resin fixedly shrunk respectively on the outer circumferences of the respective pipes;
    a clamp formed from at least one band-shaped plate member having a plurality of curved pipe-engaging portions, each said curved pipe-engaging portion partly encircling one said cylindrical member fixed on the outer circumference of one said pipe, the band-shaped plate member of the clamp having at least one projection for each said pipe, each said projection biting into the resin of the cylindrical member fixed to the corresponding pipe and being disposed such that the center axis of the respective pipe is intermediate the projection and the corresponding curved pipe-engaging portion of the band-shaped plate member; and
    fastening means for fastening opposed portions of the band-shaped plate member of the clamp in proximity to one another for causing said projections to bite into the cylindrical members and urging the respective pipes into tight clamping engagement with the respective curved pipe-engaging portions of the clamp.

2. A pipe fixing structure as in claim 1, wherein the clamp consists of a single band-shaped plate member folded in a longitudinally central portion thereof.

3. A pipe fixing structure as in claim 2, wherein the plurality of pipes comprise at least first and second pipes, and wherein the fastening means is disposed intermediate the first and second pipes.

4. A pipe fixing structure as in claim 3, wherein the pipe fastening means is an elongated member connecting opposed locations on the band-shaped plate member of the clamp, the projections being aligned substantially parallel to the fastening means.

5. A pipe fixing structure as in claim 4, wherein the fastening means is a bolt.

6. A fastening structure as in claim 4, wherein fastening means is a rivet.

7. A pipe fixing structure as in claim 1, wherein the clamp is formed from first and second separate band-shaped plate members connected to one another by the fastening means.

8. A pipe fixing structure as in claim 7, wherein the plurality of pipes comprises at least first and second pipes, the fastening means being disposed intermediate the first and second pipes.

9. A pipe fixing structure as in claim 8, wherein the projections are between the fastening means and the center axis of the respective pipe.

10. A pipe fixing structure as in claim 7, wherein the plurality of pipes comprises at least first and second pipes, the first pipe having a smaller diameter than the second pipe.

11. A pipe fixing structure as in claim 7, wherein portions of the clamp engaged by the fastening means are spaced from one another.

12. A pipe fixing structure as in claim 7, wherein the projections are parallel to the fastening means.

13. A pipe fixing structure as in claim 1, wherein each cylindrical member is axially shorter than the pipes.

* * * * *